United States Patent
Betts et al.

[11] Patent Number: 5,995,558
[45] Date of Patent: Nov. 30, 1999

[54] ROB BIT COMPENSATION SYSTEM AND METHOD ASSOCIATED WITH A RECEIVER OR CODEC

[75] Inventors: William Lewis Betts, St. Petersburg; Keith Alan Souders, Tampa, both of Fla.

[73] Assignee: Telogy Networks, Inc., Germantown, Md.

[21] Appl. No.: 08/936,077

[22] Filed: Sep. 23, 1997

Related U.S. Application Data

[63] Continuation of application No. 08/697,373, Aug. 23, 1996, Pat. No. 5,761,247.

[51] Int. Cl.$^6$ .............................. H04L 27/06; H03D 1/04
[52] U.S. Cl. ......................... 375/316; 375/346; 370/523
[58] Field of Search ........................... 370/523; 375/222, 375/242, 254, 316, 285, 346

[56] References Cited

U.S. PATENT DOCUMENTS

| | | | |
|---|---|---|---|
| 3,452,330 | 6/1969 | Avery | 371/32 |
| 4,529,979 | 7/1985 | Kusama et al. | 340/825.05 |
| 4,571,736 | 2/1986 | Agrawal et al. | 375/244 |
| 4,589,111 | 5/1986 | Adachi | 371/32 |
| 4,677,645 | 6/1987 | Kaniwa et al. | 375/222 |
| 4,720,829 | 1/1988 | Fukasawa et al. | 371/5.5 |
| 4,856,030 | 8/1989 | Batzer et al. | 375/222 X |
| 4,885,755 | 12/1989 | Yoshida | 375/222 X |
| 4,926,355 | 5/1990 | Boreland | 364/200 |
| 4,928,276 | 5/1990 | Blondeau, Jr. et al. | 370/523 |
| 5,027,356 | 6/1991 | Nakamura et al. | 371/32 |
| 5,263,081 | 11/1993 | Nightingale et al. | 379/90 |
| 5,282,197 | 1/1994 | Kreitzer | 370/522 |
| 5,406,583 | 4/1995 | Dagdeviren | 375/5 |
| 5,422,876 | 6/1995 | Turudic | 370/15 |
| 5,491,695 | 2/1996 | Meagher et al. | 370/112 |
| 5,502,733 | 3/1996 | Kishi et al. | 371/32 |
| 5,506,956 | 4/1996 | Cohen | 395/182.04 |
| 5,528,579 | 6/1996 | Wadman et al. | 370/15 |
| 5,528,625 | 6/1996 | Ayanoglu et al. | 375/222 |
| 5,533,121 | 7/1996 | Suzuki et al. | 379/410 |
| 5,577,105 | 11/1996 | Baum et al. | 379/93 |
| 5,577,196 | 11/1996 | Peer | 395/182.02 |
| 5,724,939 | 3/1998 | Dagdeviren | 375/296 |

OTHER PUBLICATIONS

Method and Apparatus Compensating for Effects of Digital Loss Insertion In Signal Transmissions Between Modems, U.S. application No. 08/390,185, filed Feb. 17, 1995, pending.

*Primary Examiner*—Tesfaldet Bocure
*Attorney, Agent, or Firm*—Thomas, Kayden, Horstemeyer & Risley, L.L.P.

[57] ABSTRACT

A rob bit compensation system improves the accuracy of digital signals received from and transmitted to a digital network, such as a telephone network, that employs rob bit signaling (RBS) wherein the network periodically robs a bit for its own use. The system can be employed within a digital modem or a coder/decoder (codec), each of which is interconnected with the digital network that periodically robs a bit every nth frame, where n is, for example, 6 or 24. The system can be implemented in association with the receive subsystem of the digital modem or in the communications paths within the codec associated with receiving data from the digital network. The system includes a compensation control utilized to detect when a least significant bit (LSB) of a particular frame of data consistently exhibits a certain logic state, either a mark (logical 1) or a space (logical 0). When an LSB of a particular frame does consistently exhibit the certain logic state, then the particular frame is considered an RBS frame. Furthermore, the compensation control causes a quantity (e.g., one-half of an LSB) to be mathematically combined (added or subtracted, whichever is appropriate) with the data corresponding with the RBS frame via a set of adders in order to enhance accuracy of the RBS frame.

24 Claims, 4 Drawing Sheets

ROB BIT COMPENSATION SYSTEM AND METHOD ASSOCIATED WITH A RECEIVER OR CODEC

This application is a continuation of application Ser. No. 08/697,373, filed Aug. 23, 1996 now issued as U.S. Pat. No. 5,761,247 on Jun. 02, 1998.

FIELD OF THE INVENTION

The present invention generally relates to data communications and, more particularly, to a rob bit compensation system and method for improving the accuracy of digital signals received from a digital network that periodically robs a bit, for example but not limited to, a telephone network.

BACKGROUND OF THE INVENTION

A telephone network is often used as an interface between a digital modem and an analog modem. Generally, a digital modem is a device that communicates digital data by using digital signals that replicate analog waveforms. An analog modem is a device that communicates digital data by encoding the data on analog waveforms.

Figure 1:
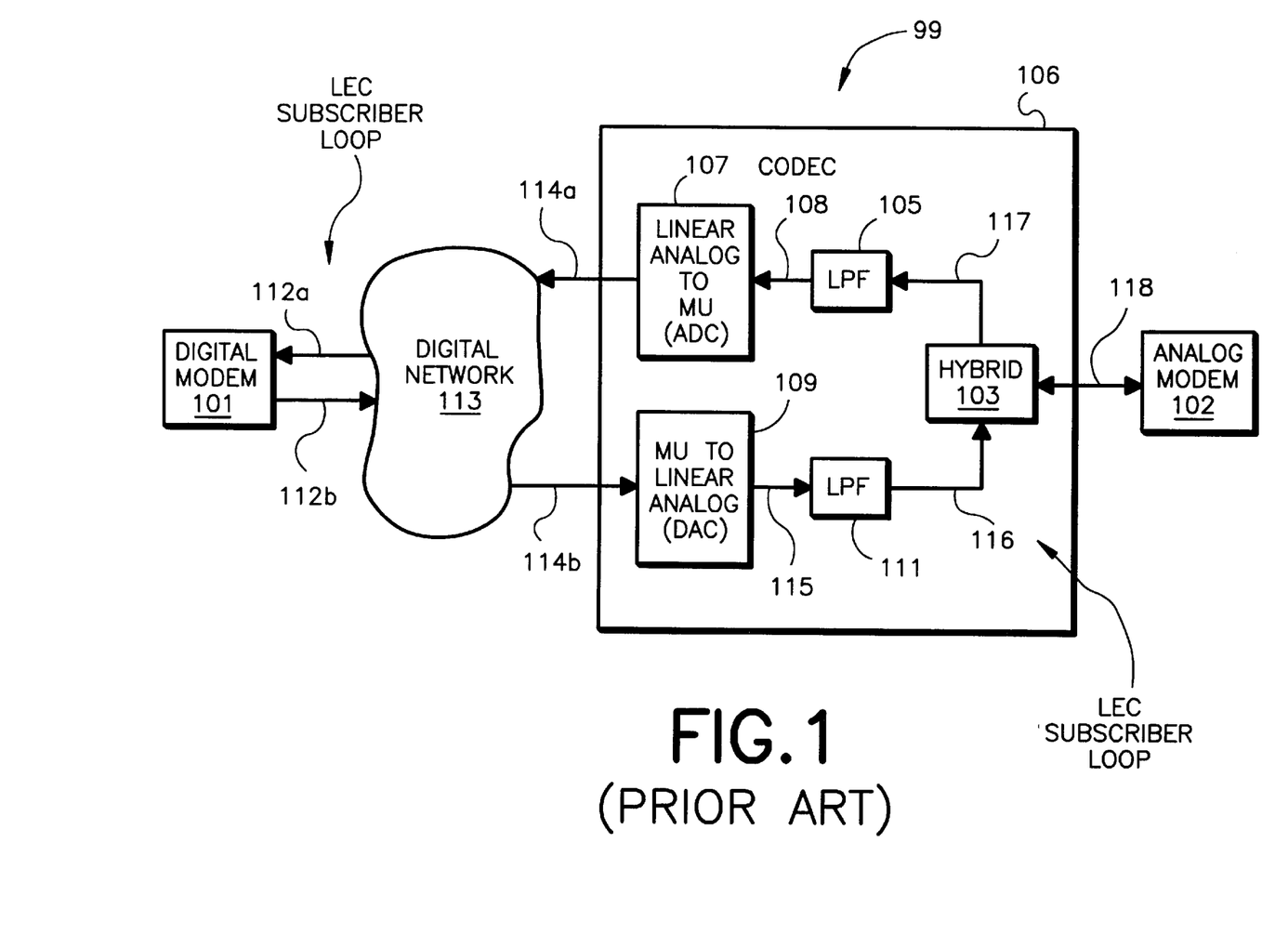
FIG. 1 is an electronic block diagram of a possible implementation for coupling together digital and analog modems over a digital network.

FIG. 1 shows a typical telephone network 99 for interconnecting a digital modem 101 and an analog modem 102. The digital modem 101 is usually interconnected with a digital network 113 via digital connections 112a, 112b. For instance, the digital modem 101 may be interconnected to a digital network 113 in the form of a public switch telephone network (PSTN) via a Local Exchange Carrier (LEC) subscriber loop. The digital network 113 may comprise, among other things, a T1 carrier system, a basic rate or primary rate Integrated Services Digital Network (ISDN), a fiber optic cable network, a coaxial cable network, a satellite network, or even a wireless digital communications network. Communications over the digital network 113 are conducted in accordance with a pulse code modulation (PCM) scheme. Channel capacity through these digital facilities is typically between 56 and 64 kilobits per second (kb/s). Coding of the signals is also employed so that compression and a constant signal/distortion performance over a wide dynamic range is achieved for optimal transmission of voice signals.

A commonly used coding technique is a nonlinear mu-law coding. The linear amplitude L corresponding with each code word is encoded, or converted to, a mu-law code word by the following equation:

$$M = (L+33) * 2^{8-N}$$

where M is the mu-law magnitude (e.g., 4 bits), L is the linear amplitude (e.g., 14 bits), and N is the mu-law segment, or frame (e.g., 3 bits). The mu-law code word is decoded, or converted to, a linear code word as follows:

$$L = \{(2M+33)2^{N} - 33\}$$

The digital network 113 is in turn interconnected with another LEC subscriber loop that includes a coder/decoder (codec) 106. The codec 106 is interconnected with the digital network 113 via digital connections 114a, 114b. The codec 106 is often situated at a telephone company office or along a street near the analog modem subscriber in a subscriber loop carrier (SLC) device. The codec 106 provides an interface between the digital network 113 and an analog telephone connection 118, sometimes referred to as a copper loop. For communications in the direction from the digital network 113 to the analog modem 102, the codec 106 includes a mu-to-linear digital-to-analog converter (DAC) 109. The converter 109 converts nonlinear mu-law levels to a linear analog signal.

For communications in the direction from the analog modem 102 to the digital network 113, the codec 106 includes a linear-to-mu analog-to-digital (ADC) converter 107. The converter 107 converts the linear analog signal to nonlinear mu-law code words.

A hybrid 103 is in communication with the DAC and ADC via respective low pass filters (LPFs) 111, 105. The hybrid 103 serves to separate the bidirectional analog signals from the analog telephone connection 118 into unidirectional transmit and receive analog signals sent to and received from the ADC 107 and the DAC 109, respectively.

Furthermore, the analog modem 102 is connected to the analog telephone connection 118 and communicates analog signals therewith. Thus, communications occur between the digital modem 101 and the analog modem 102 by way of the digital network 113 and the codec 106.

A method known as rob bit signaling (RBS) is oftentimes utilized in the digital network 113 to communicate on-hook/off-hook status between the modems 101, 102 and the digital network 113. RBS forces the least significant bit (LSB) of every nth frame, where n is typically 6 or 24, to a constant logic level, either logical 1 or 0. Unfortunately, RBS causes the block error rate of data transfers to increase and the peak error to increase from 0.5 LSB to 1.5 LSB, as is illustrated in FIG. 2.

Figure 2:
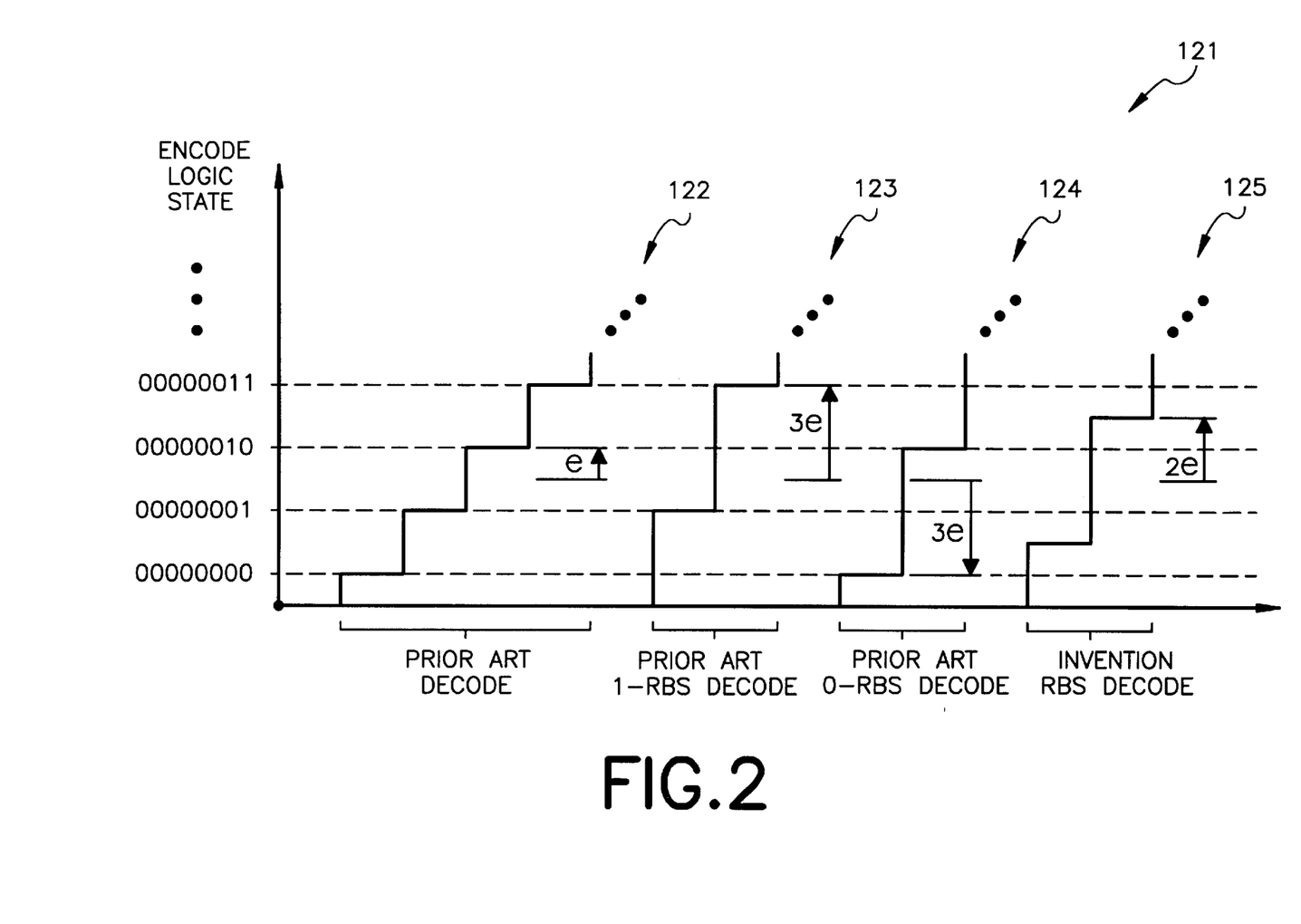
FIG. 2 is a graph comparing the effects of rob bit signaling (RBS) in a prior art decoding system and in a decoding system that employs the rob bit compensation system of the invention.

More specifically, with reference to FIG. 2, logic states are decoded by a receive subsystem associated with the digital modem 101 in accordance with the decode step function indicated at reference numeral 122. The possible maximum error e resulting from the encoding/decoding process for any given signal level is 0.5 LSB. Further, when an RBS frame occurs, the LSB is driven to a predetermined logical state, either a mark (logical 1) or a space (logical 0). Therefore, the logic states are decoded as indicated by step functions 123 and 124 for the mark and space, respectively, as shown FIG. 2. The possible maximum error in both the 1-RBS frame and the 0-RBS frame resulting from the encoding/decoding process is 3*e, or 1.5 LSB. Almost needless to say, high speed modem performance is seriously degraded as a result of RBS.

Hence, there exists a need in the industry for systems and methods for coping with RBS and for increasing the speed of data transfers through the digital network that periodically robs a bit.

SUMMARY OF THE INVENTION

The invention provides for a rob bit compensation system and method for improving the accuracy of digital signals received from a digital network, such as a telephone network, that periodically robs a bit. As a result of the inventive system and method, high speed data transfers through the digital network are realized.

In general, the invention can be employed within a digital modem or a coder/decoder (codec), each of which is interconnected with a digital network that periodically robs a bit every nth frame, where n is, for example but not limited to, 6, 12, or 24. The rob bit compensation system can be implemented in association with the receive subsystem that is associated with the digital modem or in a subsystem within a codec that is associated with the communication path that receives data from the digital network.

In the context of the receive subsystem in a digital modem, the rob bit compensation system is employed as follows. A compensation control of the rob bit compensation system is utilized to receive digital data, such as mu-law coded data, from the digital network. The compensation control detects when a least significant bit (LSB) of a particular frame of the digital data consistently exhibits a certain logic state, either a mark (logical 1) or a space (logical 0). When an LSB of a particular frame does consistently exhibit the certain logic state, then the particular frame is an RBS frame. Furthermore, the compensation control causes a quantity to be mathematically combined with the linear digital data corresponding with the RBS frame via an adder(s) in order to enhance accuracy of the RBS frame. As an example, one-half of an LSB may be subtracted from (i.e., add 2's complement) the digital data corresponding with the RBS frame when the certain logic state is a logical 1, or alternatively, one-half of an LSB may be added to the digital data corresponding with the RBS frame when the certain logic state is a logical 0.

In the context of a codec, the rob bit compensation system is employed as follows. The codes is configured to convert an analog signal that is directed in a first direction (e.g., received from an analog modem) from a linear analog signal to mu-law nonlinear digital data and the mu-law digital data that is directed in a second direction (e.g., received from the digital network) that opposes the first direction from mu-law nonlinear digital data to a linear analog signal. The compensation control of the rob bit compensation system can be utilized to detect when an LSB of a particular frame of the signals received from the digital network consistently exhibit a certain logic state. Furthermore, a quantity can be combined with the particular frame, or the RBS frame, in order to enhance accuracy of the RBS frame.

The invention can also be conceptualized as providing a method for improving the accuracy of digital data received from a digital network that periodically robs a bit. The method can be broadly summarized as follows: receiving digital data from the digital network; detecting a frame in the received digital data having a rob bit; and modifying the frame so that error associated with the frame resulting from the rob bit is reduced.

The invention has numerous advantages, a few of which are delineated hereafter, as merely examples.

An advantage of the invention is that it increases the accuracy of data received from a digital network that periodically robs a bit.

Another advantage of the invention is that data transfer rates through the digital network can be increased.

Another advantage of the invention is that it reduces the RBS induced peak error in a received signal from 1.5 LSB to 1.0 LSB.

Another advantage of the invention is that it can detect any number and frequency of RBS frames, even when the digital network includes a plurality of subnetworks, each of which robs its own bit.

Another advantage of the invention is that the data rate of modem communications can be increased from 28,800 b/s to 33,600 b/s.

Another advantage of the invention is that for modems operating at 33,600 bits per second (B/S), the invention reduces the block error rate from at least 0.03 to 0.003 and typically achieves at least tenfold improvement.

Another advantage of the invention is that it is simple in design, easily implemented in existing digital modems and codecs, and is reliable in operation.

Another advantage of the invention is that it can be implemented with software, hardware, or a combination thereof. Preferably, the invention is implemented in software that is stored in memory and that configures and drives a conventional digital signal processor (DSP).

Other objects, features, and advantages of the present invention will become apparent to one with skill in the art upon examination of the following drawings and detailed description. It is intended that all such additional objects, features, and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. In the drawings, like reference numerals designate corresponding parts throughout the several views.

DETAILED DESCRIPTION OF THE PREFERRED EMBODIMENTS

Figure 3:
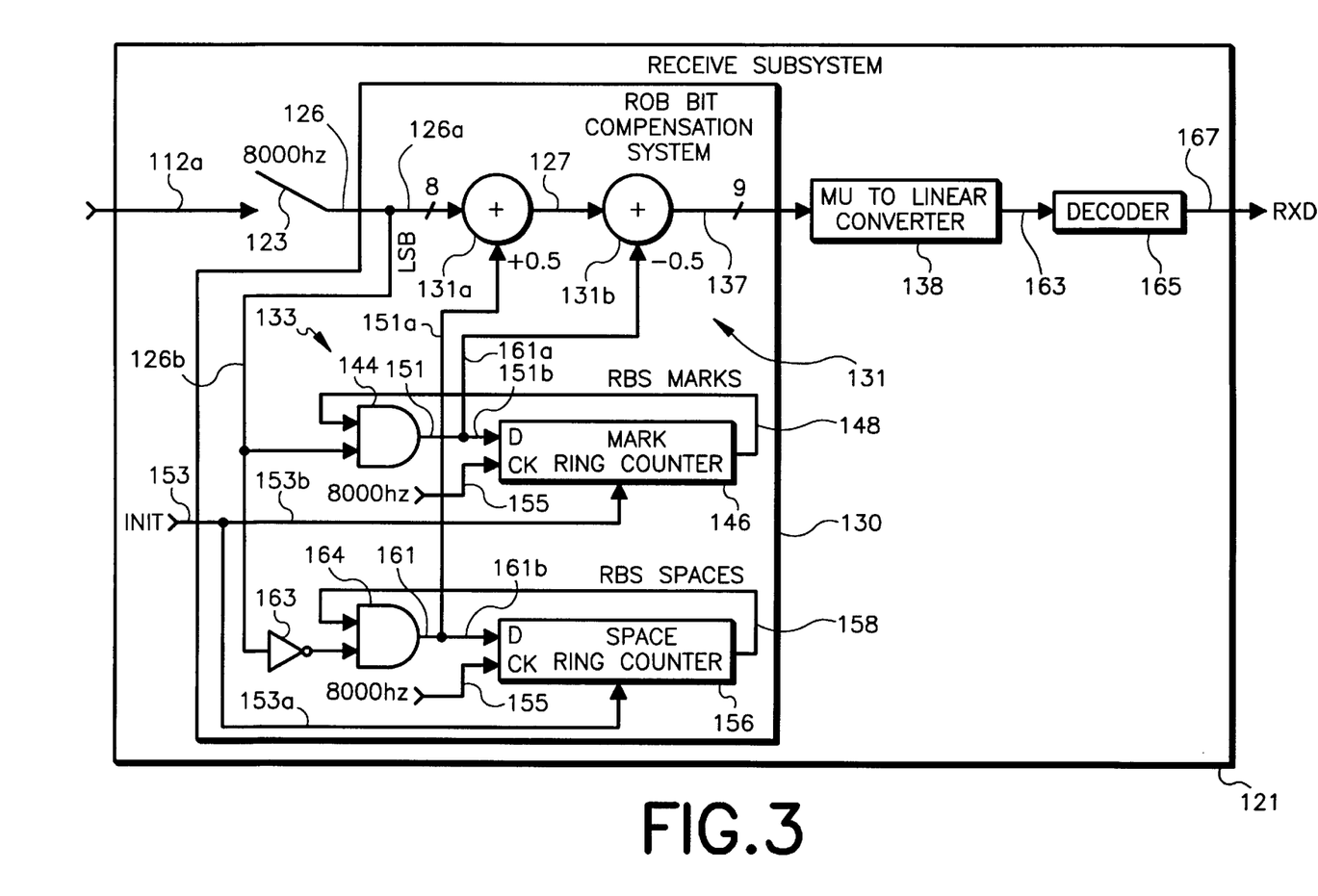
FIG. 3 is an electronic block diagram of a possible implementation of a receive subsystem that employs the rob bit compensation system of the invention within the digital modem of FIG. 1.

The invention is a rob bit compensation system 130, which will be described hereafter with reference to FIGS. 2 through 4. Generally, the rob bit compensation system 130 of the invention can be implemented in connection with a data path in either the digital modem 101 (FIG. 1), in a codec 106 (FIG. 1), or elsewhere, in order to compensate for and minimize the distortion imposed upon data that is received from a digital network 113 (FIG. 1) that periodically robs a bit from every nth frame, where n is typically 6, 12, or 24. When implemented in the digital modem 101, the rob bit compensation system 130 can be employed in connection with a receive subsystem (FIG. 3). When implemented in connection with a codec 106 (FIG. 4), the rob bit compensation system 130 is employed in connection with the data path leading from the digital network 113. Note that commonly assigned U.S. Pat. No. 5,729,226 entitled "Rob Bit Compensation System and Method Associated With A Transmitter Or Codec," filed on Aug. 23, 1996 by the inventors herein describes a rob bit compensation system that can be utilized in connection with a transmit subsystem or codec for manipulating data that is transmitted to the digital network, as opposed to data that is received from the digital network.

A. Receive Subsystem

The rob bit compensation system 130, as employed in connection with a receive subsystem 121 within the digital modem 101 (FIG. 1), will now be described with reference to FIG. 3. The general functionality implemented by the receive subsystem 121 of FIG. 3 in combination with the rob bit compensation system 130 can be broadly summarized as follows.

Non-RBS Frames

For frames of digital data that do not have a rob bit, the rob bit compensation system 130 passes the digital data essentially unchanged to a mu-to-linear converter 138, which converts the mu-law code words to linear code words via the following equation:

$$L=\{(2M+33)2^N-33\}$$

where L is the linear magnitude (e.g., 14 bits) corresponding with each code word, M is the mu-law magnitude (e.g., 4 bits), and N is the mu-law segment (e.g., three bits).

RBS Frames Having a Mark LSB

For frames of digital data that have a rob bit in the form of a mark, the combination of the rob bit compensation system 130 and mu-to-linear converter 138 functions as follows. Each mu-law code word is converted to a linear code word by the following equation:

$$L=\{(2M+32)2^N-33\}$$

RBS Frames Having a Space LSB

For frames of digital data that have a rob bit in the form of a space, the combination of the rob bit compensation system 130 and mu-to-linear converter 138 functions as follows. Each mu-law code word is converted to a linear code word by the following equation:

$$L=\{(2M+34)2^N-33\}$$

With reference to FIG. 3, the receive subsystem 121 is configured to receive a serial stream of mu-law code words from the digital network 113, as denoted by connection 112a. When the digital network 113 is a telephone network, the mu-law code words are generally 8 bits each and are pulse code modulated at 8000 hz from, for instance, a T1 carrier connection, a basic rate ISDN connection, or a primary rate ISDN connection.

A sampling switch 123 communicates the mu-law code words 112a to a rob bit compensation system 130. Specifically, the switch 123 communicates the mu-law code words 112a to a compensation addition mechanism 131 (adders 131a, 131b) within the rob bit compensation system 130. When an RBS frame is detected by the rob bit compensation system 130, the compensation addition mechanism 131 is controlled to enhance the accuracy of each RBS frame by combining a quantity (i.e., adding or subtracting an amount) with each RBS frame.

Architecturally, the compensation addition mechanism 131 as shown in FIG. 3 includes successive adders 131a, 131b and is controlled by a compensation control 133. Generally, the compensation addition mechanism 131 receives successive 8-bit mu-law code words 126a and to each, it performs one of the following: (a) mathematically combines a zero with the code word 126a to convert the 8-bit code word 126a to a 9-bit code word 137 (i.e., effectively, forwards the code word 126a unchanged but with an additional bit); (b) adds 0.5 LSB to the code word 126a in order to produce a 9-bit mu-law code word 137; or (c) subtracts 0.5 LSB (i.e., adds 2's complement of 0.5 LSB, or −0.5 LSB) to the code word 126a in order to produce a 9-bit mu-law code word 137. In order to accomplish the aforementioned functionality, the adder 131a of the compensation addition mechanism 131 is configured to add either nothing or +0.5 LSB to each 8-bit code word 126a in order to generate a 9-bit code word 127, while similarly, the adder 131b is configured to add either nothing or −0.5 LSB to each 9-bit code word 127 in order to generate a 9-bit code word 137.

The compensation control 133 controls the adders 131a, 131b, as indicated by respective reference arrows 151a, 161a, to accomplish one of the aforementioned options. Furthermore, the compensation control 133 is configured to receive the LSB 126b of each code word 126. The compensation control 133 detects when an RBS frame occurs and is configured to advise the compensation addition mechanism 131 when to combine a quantity (i.e., to effectively add or subtract an amount) with the RBS frame in order to enhance the accuracy of the RBS frame. In architecture, the compensation control 133 of the rob bit compensation system 130 has mark RBS logic for detecting an RBS frame having an LSB that is a mark and space RBS logic for detecting an RBS frame having an LSB that is a space. The space and mark RBS logics generate respective control signals 151a, 161a for the compensation addition mechanism 131. The signals 151a, 161a are indicative of whether or not there is an RBS frame and whether the RBS frame either has a space LSB or a mark LSB, respectively.

The mark RBS logic includes an AND logic gate 144 and a mark ring counter 146. The AND logic gate 144 receives the LSB 126b from each incoming frame and the output 148 from the mark ring counter 146. The AND logic gate 144 produces a data signal 151 for the mark ring counter 146 based upon its inputs 126b, 148. Based upon its logic state, the signal 151 indicates whether or not an RBS frame having a mark LSB is present.

The mark ring counter 146 is a shift register or other suitable mechanism. The mark ring counter 146 is configured to receive its own output at its data terminal (D), by way of the AND logic gate 144 as indicated by successive reference numbers 148, 144, 151. The counter 146 is preset so that all states exhibit a logical 1 via an initialization (INIT) signal 153b and is clocked by a clock signal 155 at a rate of preferably 8000 hz to correspond with the frame frequency rate of the incoming signal 126.

In the preferred embodiment, the mark ring counter 146 is an n state device, where n represents the frequency of the RBS frame. Typically, n is 6, 12, or 24. The mark ring counter 146 is shifted one state of n states every frame. In FIG. 3, the mark ring counter 146 shifts to the left so that the most significant bit (MSB) is output at reference arrow 148. When RBS compensation should be applied, the mark ring counter 146 output (i.e., the most significant bit (MSB) of the stored word) exhibits a logical 1, the LSB 126b exhibits a logical 1, and thus, the AND logic gate output 151 exhibits a logical 1. Hence, the combination of the AND logic gate 144 and the mark ring counter 146 automatically tracks the RBS frames that have a mark LSB.

The space RBS logic detects RBS frames having an LSB that exhibits a space. The space RBS logic includes an inverter 163, an AND logic gate 164, and a space ring counter 156. The inverter 163 and the AND logic gate 164 are implemented in succession. The AND logic gate 164 receives the inverse of the LSB 126b from each incoming frame and the output 158 from the space ring counter 146. The AND logic gate 164 produces a data signal 161 for the space ring counter 156 based upon its inputs 126b, 158. Based upon its logic state, the signal 161 indicates whether or not an RBS frame having a space LSB is present.

The space ring counter 156 is a shift register or other suitable mechanism. The space ring counter 156 is configured to receive its own output at its data terminal (D), by way of the AND logic gate 164 as indicated by successive reference numbers 158, 164, 161. The counter 156 is preset so that all states exhibit a logical 1 via an initialization (INIT) signal 153a and is clocked by a clock signal 155 at a rate of preferably 8000 hz to correspond with the frame frequency rate of the incoming digital data 126.

In the preferred embodiment, just as with the mark ring counter 146, the space ring counter 156 is an n state device, where n represents the frequency of the RBS frame, and the space ring counter 156 is shifted one of n states every frame. In FIG. 3, the space ring counter 156 shifts to the left so that the MSB is output at reference arrow 158. When space RBS compensation should be applied, the space ring counter 156 output (i.e., the most significant bit (MSB) of the stored word) exhibits a logical 1, the LSB 126b exhibits a logical 0, the inverter 163 exhibits a logical 1, and thus, the AND logic gate output 161 exhibits a logical 1. Hence, the combination of the inverter 163, the AND logic gate 164, and the mark ring counter 156 automatically tracks the RBS frames that have a space LSB.

As a result of the rob bit compensation system 130 in FIG. 3, the receive subsystem 121 can decode each RBS frame so that the maximum possible error in each RBS frame is no greater than 1.0 LSB (i.e., 2*e), as is reflected in the step function 125 in FIG. 2. Recall that the possible maximum error in the RBS frame resulting from the encoding/decoding process of the prior art is 1.5 LSB (i.e., 3*e). Almost needless to say, modem performance is significantly improved by the invention during an RBS frame.

Further note that multiple RBS bits can occur as the signal passes through multiple switches, multiplexers, or subscriber loop carriers (SLC) associated with the digital network 113. Thus, the ring counters 146, 156 may need to monitor and compensate for RBS in multiple bit positions.

The mu-to-linear converter 138 receives the 9-bit mu-law code words 137 from the compensation addition mechanism 131 of the rob bit compensation system 130. The converter 138 is a well known component and is configured to perform a mu-law expansion operation on the mu-law digital signal 137. In this regard, in the preferred embodiment, the converter 138 converts each 9-bit mu-law code word 137 to a 14-bit linear code word 163, which is passed to a decoder 165.

The decoder 165 includes functionality for demodulating and processing the received signal so that it can be communicated to a local DTE. For this purpose, the decoder 165 may include, for example, an echo canceler, a filter, an equalizer, etc. The decoder 165 may be designed to implement any suitable industry standard protocol, for example but not limited to, the V.34 recommendation. When the decoder 165 employs V.34 demodulation and signal processing, the data 167 that is output from the decoder 165 complies with the V.34 protocol so that the data stream corresponds with one of the fourteen possible V.34 speeds between 2400 b/s, and 33,600 b/s, inclusive. As is well known in the art, the V.34 protocol implements a form of quadrature amplitude modulation.

After performing the demodulation and other signal conditioning processes, the decoder 165 outputs the receive data 167 in the form of a digital data stream to a DTE, for example but not limited to, a computer with a large data base.

The elements of the receive subsystem 121 of FIG. 3, as described previously, can be implemented in software, firmware, hardware, or a combination thereof. In the preferred embodiment, these elements, and particularly, the rob bit compensation system 130, is implemented in software that is stored in memory and that configures and drives a digital signal processor (DSP). The appendix to this document shows the preferred embodiment for the code that can be utilized for driving a DSP to implement the rob bit compensation system 130.

When implemented in software, the rob bit compensation system 130 can be stored and transported on any computer-readable medium for use by or in connection with a computer-related system or method. In the context of this document, a computer-readable medium is an electronic, magnetic, optical, or other physical device or means that can contain or store a computer program for use by or in connection with a computer-related system or method.

EXAMPLE

In order to further clarify operation of the rob bit compensation system 130, an example with specific data is set forth hereafter. First, it is assumed that the rob bit compensation system 130 receives data 126 in the form of a series of 8-bit frames with bit patterns as set forth in Table A hereafter.

TABLE A

| FRAME # | DATA LSB |
|---------|----------|
| 1 | 0110000 1 |
| 2 | 0010111 0 |
| 3 | 1111001 1 |
| 4 | 1010010 1 |
| 5 | 0000100 0 |
| 6 | 0101011 1 |
| 1 | 1111000 1 |
| 2 | 1010000 0 |

Based upon the frames set forth in Table A, the compensation control 133 will determine that the digital network 113 employs 3 rob bits in the form of a mark in the frames 1, 3, and 4.

Specifically, the mark ring counter 146 will be loaded via the LSBs 126b with the bit pattern "101100", each bit of which corresponds to a frame, and the space ring counter 156 is loaded with the bit pattern "000000", each bit of which corresponds to a frame. These patterns are shifted one bit to the left in each counter 156, 146 during each frame, and the most significant bit (MSB) in each counter 146, 156 is analyzed by being passed to the respective adders 131a, 131b, as indicated by corresponding reference arrows 151, 161 (FIG. 3).

When the MSB in mark ring counter 146 is a logical "1", then the adder 131b will add −0.5 LSB to the respective frame, and in converse, when the MSB in the mark ring counter 146 is a logical "0", then the adder 131b will add nothing to the respective frame. Similarly, when the MSB in the space ring counter 156 is a logical "1", then the adder 131a will add +0.5 LSB to the respective frame, and in converse, when the MSB in the space ring counter 156 is a logical "0", then the adder 131a will add nothing to the respective frame.

As is apparent from the examples of the bit patterns, the mark ring counter 146 will cause −0.5 LSB to be added (i.e., subtract 0.5 LSB from) to select frames, while the space ring counter 156 will cause no quantities to be added to any of the frames. Table B set forth hereafter illustrates the shifting of the word in the mark ring counter 146 and the implementation of compensation during RBS frames.

TABLE B

| FRAME # | DATA LSB | MARK RING COUNTER VALUE | COMPENSATION |
|---------|----------|-------------------------|--------------|
| 1 | 0110000 1 | 101100 | yes |
| 2 | 0010111 0 | 011001 | no |
| 3 | 1111001 1 | 110010 | yes |
| 4 | 1010010 1 | 100101 | yes |
| 5 | 0000100 0 | 001011 | no |
| 6 | 0101011 1 | 010110 | no |
| 1 | 1111000 1 | 101100 | yes |
| 2 | 1010000 0 | 011001 | no |

As illustrated in Table B, with the specific counter bit patterns set forth previously in this example, every first, third, and fourth frame will be compensated by addition of —0.5 LSB, while the remainder of the frames are left unchanged, regardless of the current state of the LSB in that frame.

B. Coder/Decoder (Codec)

The codec 106 (FIG. 1) can also be equipped with a rob bit compensation system 130 in connection with one or both of its data streams. The rob bit compensation system 130 may be associated with the communications connection 114b leading from the digital network 113. The rob bit compensation system 130 may also be associated with the communications connection 114a leading to the digital network 113. However, this implementation generally requires some type of feedback in order to know which frames are LSB frames, and accordingly, this design is more complex and more costly, making it undesirable in many cases. The latter configuration is not shown in the figures for simplicity, while the former configuration is illustrated in FIG. 4 and described hereafter. For a discussion of the latter configuration, refer to commonly assigned U.S. Pat. No. 5,729,226 entitled "Rob Bit Compensation System and Method Associated With A Transmitter Or Codec," filed Aug. 23, 1996 by the inventors herein.

Figure 4:
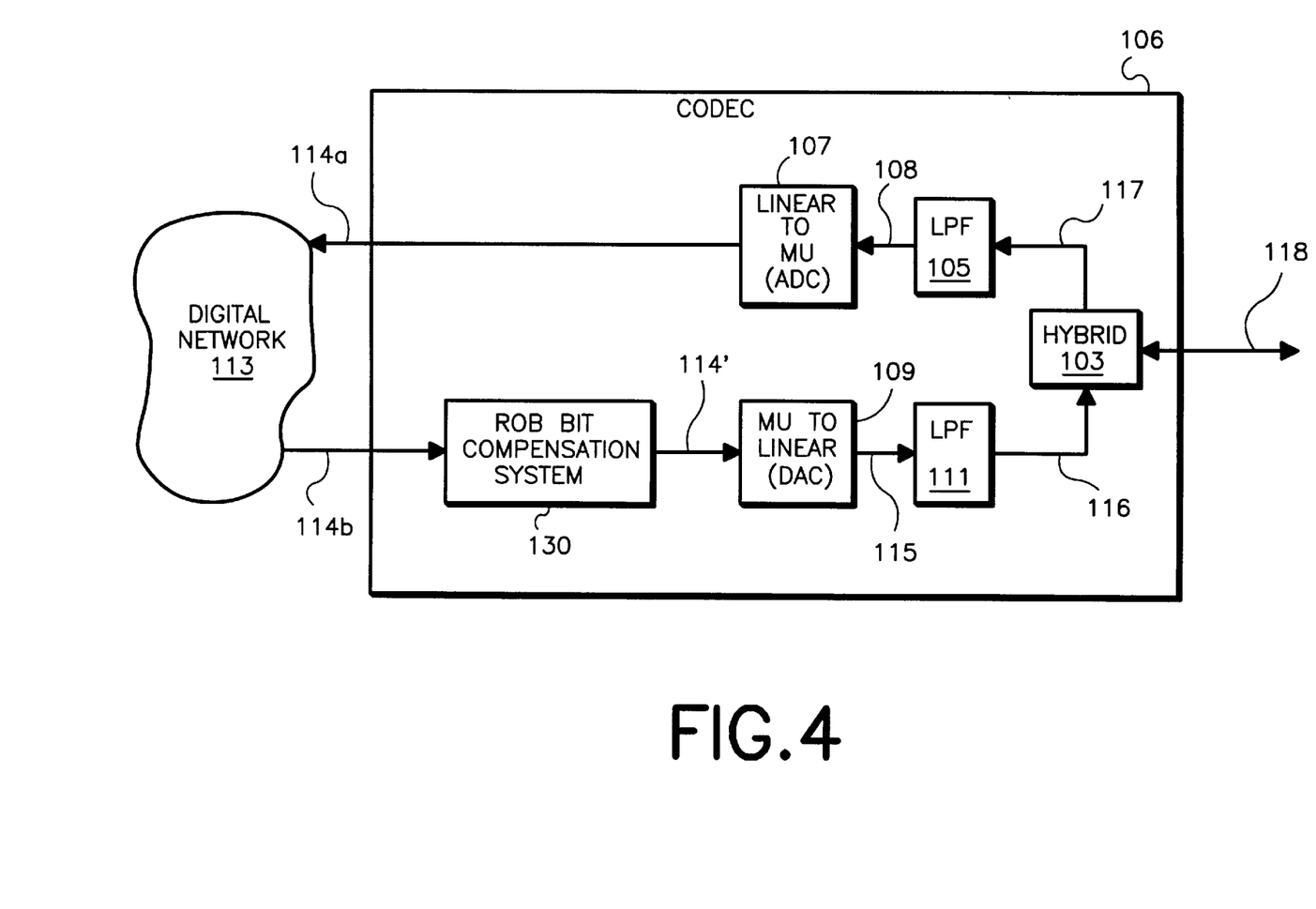
FIG. 4 is an electronic block diagram of a possible implementation of a coder/decoder (codec) that employs the rob bit compensation system of FIG. 3.

With reference to FIG. 4, in regard to the communications connection 114b, the rob bit compensation system 130 is configured to receive the stream of mu-law nonlinear digital code words on connection 114b from the digital network 113. Further, the system 130 is adapted to combine compensation, when appropriate, to produce a compensated mu-law nonlinear digital code words 114b', which are passed to a mu-to-linear digital-to-analog (DAC) converter 109. The mu-to-linear DAC 109 produces a linear analog signal 115 for the LPF 111.

In the preferred embodiment, the rob bit compensation system 130 causes one-half of an LSB to be subtracted from the mu-law nonlinear digital code word 114b corresponding with the RBS frame when the RBS LSB is a mark (logical 1), or alternatively, one-half of an LSB to be added to the mu-law nonlinear digital code word 114b corresponding with the RBS frame when the RBS LSB is a space (logical 0).

Note that the elements of the codes 106 of FIG. 4 can be implemented in software, firmware, hardware, or a combination thereof. In the preferred embodiment, the elements 103, 105, 107, 109, and 111 are implemented in hardware, while the rob bit compensation system 130 is implemented in hardware or software/firmware in the DAC 109. In embodiments where the system 130 is implemented in software or firmware, it may be stored and transported on any computer-readable medium for use by or in connection with a computer-related system or method.

C. Software

The rob bit compensation system 130 of the invention can be implemented in software. One possible implementation of the software version for the receive subsystem 121 is set forth hereafter.

```
mu2lin:
    y=0x00ff              /* mask for input Mulaw value */
                          /* y =     0000 0000 1111 1111 */
    a0=a0&y               /* mask lower 8 bits of a0h */
    if eq a0=y            /* Invert if zero */
    a0=a0 ^ y             /* invert Mulaw bits since an */
                          /* inverted Mulaw value is expected */
                          /* a0h =0000 0000 Seee cccc */
    r1=temp
    x=33
    r0=rbs_ring           /* Read RBS identifier bits */
    a1=*r0++
    a11=*r0- -
    a1=a1<<1              /* Shift next bit to msb */
    *r0++=a1              /* Save RBS identifiers */
    y=1                   /* Test lsb of mulaw input */
    y1=0x80               /* Set RBS identifier bit */
    if p1 goto mu2lin20   /* No changes if msb=0, detector 1 */
    a0&y
    if ne goto mu2lin20   /*No change if lsb=1, no RBS */
    x=34                  /* Change conversion constant */
    a1=a1|y
mu2lin20:
    *r0++=a11             /* Save RBS identifiers */
mu2lin30:
    a1=*r0++
    a11=*r0- -
    a1=a1<<1              /* Shift next bit to msb */
    *r0++=a1              /* Save RBS identifiers */
    if p1 goto mu2lin40   /* No changes if msb=0, detector 2 */
    a0&y
    if eq goto mu2lin40   /* No change if lsb=0, no RBS */
    x=32                  /* Change conversion constant */
    a1=a1|y
mu2lin40:
    *r0++=a11             /* Save RBS identifiers */
    *r1=x                 /* Save constant */
    a1=a0>>4              /* segment into lower 3 bits */
                          /* a1h=0000 0000 0000 Seee */
    y=0x0007              /* mask for segment (exponent) */
                          /* y =     0000 0000 0000 0111 */
    a1=a1&y               /* a1h=0000 0000 0000 0eee */
    a1=-a1                /* negate the segment number */
    c0=a1                 /* set counter to negative segment */
                          /* number */
    y=0x000f              /* mask for compressed code word */
                          /* y =     0000 0000 0000 1111 */
    a1=a0&y               /* a1h=0000 0000 0000 cccc*/
    a1=a1<<1              /* compressed code word left */
                          /* a1h=0000 0000 000c ccc0 */
    y=*r1                 /* put 1s before and after the    */
    a1=a1+y               /* compressed code word */
                          /* a1h=0000 0000 001c ccc1 */
    do 7 {                /* the formatted compressed */
        if c01t a1=a1<<1  /* code word into place, i.e. */
    }                     /* apply exponent (segment)        */
                          /* a1h=00 0000 001c ccc1 seg=0    */
                          /* a1h=00 0000 01cc cc10 seg=1    */
                          /* a1h=00 0000 1ccc c100 seg=2    */
                          /* a1h=00 0001 cccc 1000 seg=3    */
                          /* a1h=00 001c ccc1 0000 seg=4    */
                          /* a1h=00 01cc cc10 0000 seg=5    */
                          /* a1h=00 1ccc c100 0000 seg=6    */
                          /* a1h=01 cccc 1000 0000 seg=7    */
    y=33
    a1=a1-y               /* a1h-=0x21 subtract bias (33) */
    y=0x0080              /* mask for sign bit */
                          /*y=    0000 0000 1000 0000 */
    a0=a0&y               /* a0h=0000 0000 S000 0000 */
    if ne a1=-a1          /* if linear value is negative then */
                          /* take the 2s complement to make the*/
                          /* value negative */
```

```
a0=a1<<1        /* the output will be 14 bits left */
                /* justified in a0h */
a0=rnd(a0)
return          /* a0h holds the 14 bit linear value */
                END OF CODE
```

Many variations and modifications may be made to the preferred embodiments of the invention. All such modifications and variations are intended to be included herein within the scope of the present invention, as is defined by the following claims.

In the claims set forth hereinafter, the structures, materials, acts, and equivalents of all "means" elements and "logic" elements are intended to include any structures, materials, or acts for performing the functions specified in connection with said elements.

Wherefore, the following is claimed:

1. A system for improving accuracy of a digital signal received from a digital network that employs rob bit signalling (RBS), comprising:
   a means for receiving digital data from said digital network;
   a means for detecting an RBS frame that has been distorted by said RBS in said digital data said detecting means including a means for analyzing a bit value of said RBS frame; and
   a means for modifying said RBS frame so that error associated with said RBS frame resulting from said RBS is reduced.

2. The system of claim 1, wherein said means for receiving, said means for detecting, and said means for modifying are all implemented in software.

3. The system of claim 1, wherein said means for receiving, said means for detecting, and said means for modifying are all implemented in a digital signal processor.

4. The system of claim 1, wherein said digital data is mu-law coded and further comprising a mu-to-linear converter connected to said means for modifying and configured to convert said mu-law digital data to linear digital data.

5. The system of claim 1, wherein said bit value corresponds to a least significant bit of said RBS frame.

6. A computer readable medium having a program for improving accuracy of a digital signal received from a digital network that employs rob bit signalling (RBS), the program comprising:
   a means for receiving digital data from said digital network;
   a means for detecting implementation of said RBS in said digital network, said detecting means including a means for analyzing a bit value of said RBS frame; and
   a means for modifying said digital data so that error associated with said digital data resulting from said RBS is reduced.

7. A method for improving accuracy of a digital signal received from a digital network that employs rob bit signalling (RBS), comprising the steps of:
   transmitting digital data over an analog connection;
   receiving said digital data from said digital network;
   detecting an RBS frame that is distorted by said RBS in said digital data received from said digital network; and
   modifying said RBS frame so that error associated with said RBS frame resulting from RBS is reduced.

8. A method for improving accuracy of a digital signal received from a digital network that employs rob bit signalling (RBS), comprising the steps of:
   receiving a frame of digital data;
   analyzing said frame of digital data;
   determining whether said frame of digital data is distorted by said RBS based on said analyzing step; and
   compensating said digital data to reduce RBS distortion when said digital data is distorted by said RBS.

9. The method of claim 8, wherein said bit value corresponds to a least significant bit of said frame of digital data.

10. A method for improving accuracy of a digital signal received from a digital network that employs rob bit signalling (RBS), comprising the steps of:
    receiving digital data;
    determining whether said digital data is distorted by said RBS; and
    compensating said digital data to reduce RBS distortion,
    wherein said step of determining includes the step of comparing a frame of digital data to a reference and said step of compensating includes the step of combining a compensation quantity with any said frame that is subjected to said RBS distortion.

11. A system for improving accuracy of data communication via a digital network that employs rob bit signalling (RBS), comprising:
    a receiver configured to receive digital data;
    a means for determining whether said digital data is distorted by said RBS, said determining means including a means for comparing a bit value of said digital data to another value; and
    a means for compensating said digital data to reduce RBS distortion.

12. A system for improving accuracy of data communication via a digital network that employs rob bit signalling (RBS), comprising:
    a receiver configured to receive digital data;
    a means for determining whether said digital data is distorted by said RBS; and
    a means for compensating said digital data to reduce RBS distortion,
    wherein said compensating means includes a means for combining a quantity with a frame of digital data that is subjected to said RBS distortion.

13. A method for improving accuracy of a digital signal received from a digital network that periodically robs a bit, comprising the steps of:
    initializing a reference value;
    receiving a plurality of frames of digital data;
    comparing a value of a respective bit of each of said plurality of frames to said reference value;
    determining whether said digital data is distorted by a robbed bit based on said comparing step; and
    compensating said digital data for an error associated with said robbed bit.

14. The method of claim 13, further comprising the step of modifying said reference value based on said comparing step.

15. A method for improving accuracy of a digital signal received from a digital network that periodically robs a bit comprising the steps of:
    receiving digital data;
    determining whether said digital data is distorted by a robbed bit; and
    compensating said digital data for an error associated with said robbed bit, wherein said compensating step includes the step of adding a quantity to a frame of said digital data.

16. The method of claim 15, wherein said quantity is one-half of a least significant bit.

17. A method for improving accuracy of a digital signal received from a digital network that periodically robs a bit, comprising the steps of:

receiving digital data;

determining whether said digital data is distorted by a robbed bit; and compensating said digital data for an error associated with said robbed bit, wherein said compensating step includes the step of subtracting a quantity from a frame of said digital data.

18. The method of claim 17, wherein said quantity is one-half of a least significant bit.

19. A system for improving accuracy of a digital signal received from a digital network that periodically robs a bit, comprising:

a means for transmitting digital data over an analog connection and through said digital network;

a means for receiving said digital data from said transmitting means; and a means for reducing distortion in said digital data caused by a robbed bit.

20. A system for improving accuracy of a digital signal received from a digital network that periodically robs a bit, comprising:

a means for receiving digital data; and a means for reducing distortion in said digital data caused by a robbed bit, wherein said means for reducing includes an adder to combine a quantity to a frame of digital data.

21. A computer readable medium having a program for improving accuracy of a digital signal received from a digital network that periodically robs a bit, the program comprising:

receiving logic configured to receive digital data;

determining logic configured to determine whether a frame of said digital data includes a robbed bit based on a comparison of a bit value of said frame to a reference value; and compensating logic configured to reduce error in said digital data from distortion caused by said robbed bit.

22. A computer readable medium having a program for improving accuracy of a digital signal received from a digital network that periodically robs a bit, the program comprising receiving logic configured to receive digital data; and compensating logic configured to reduce error in said digital data from distortion caused by a robbed bit, wherein said compensating logic further comprises:

detecting logic configured to detect whether a frame of said digital data has said robbed bit; and combining logic configured to combine a quantity to said frame when said frame has said robbed bit.

23. A method for improving accuracy of digital data received from a digital network that periodically forces at least one bit of said digital data to a certain binary logic level, comprising the steps of:

receiving a frame of said digital data from said digital network;

determining whether said frame of digital data has at least one bit forced to said certain binary logic level by said digital network;

analyzing said at least one bit during said determining step; and compensating said frame of digital data to reduce distortion caused by said digital network forcing at least one bit of said digital data to said certain binary logic level.

24. A method for improving accuracy of digital data received from a digital network that periodically forces at least one bit of said digital data to a certain binary logic level, comprising the steps of:

receiving a frame of said digital data from said digital network;

determining whether said frame of digital data has at least one bit forced to said certain binary logic level by said digital network; and compensating said frame of digital data to reduce distortion caused by said digital network forcing at least one bit of said digital data to said certain binary logic level, wherein said compensating step includes the step of combining a quantity to said frame of digital data.

* * * * *